United States Patent
Bastholm

(10) Patent No.: US 10,243,450 B2
(45) Date of Patent: Mar. 26, 2019

(54) FLYBACK CONVERTER WITH A SNUBBER CIRCUIT

(71) Applicant: Linak A/S, Nordborg (DK)

(72) Inventor: Jeppe Christian Bastholm, Sønderborg (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 15/562,584

(22) PCT Filed: Mar. 30, 2016

(86) PCT No.: PCT/DK2016/000011
§ 371 (c)(1),
(2) Date: Sep. 28, 2017

(87) PCT Pub. No.: WO2016/155737
PCT Pub. Date: Oct. 6, 2016

(65) Prior Publication Data
US 2018/0091039 A1    Mar. 29, 2018

(30) Foreign Application Priority Data
Mar. 31, 2015 (DK) .................... 2015 00206

(51) Int. Cl.
*H02M 1/34* (2007.01)
*H02M 3/335* (2006.01)
(Continued)

(52) U.S. Cl.
CPC ............ *H02M 1/34* (2013.01); *H02M 3/335* (2013.01); *H02M 7/162* (2013.01);
(Continued)

(58) Field of Classification Search
None
See application file for complete search history.

(56) References Cited

U.S. PATENT DOCUMENTS

2007/0263415 A1  11/2007  Jansen et al.
2009/0257255 A1  10/2009  Zhang
(Continued)

FOREIGN PATENT DOCUMENTS

JP         2000233090          8/2000

OTHER PUBLICATIONS

English language abstract of JP2000233090 (Aug. 29, 2000).
(Continued)

*Primary Examiner* — Henry Lee, III
(74) *Attorney, Agent, or Firm* — Dykema Gossett PLLC

(57) ABSTRACT

A flyback converter (21) for use in a power supply for an electric actuator system comprises a snubber circuit with a snubber capacitor (23) for accumulating energy stored in a leakage inductance of a flyback transformer (4) when a primary current ($I_{prim}$) is switched off. The snubber circuit further comprises a controllable switching element (24) in series with the snubber capacitor (23) with a control terminal connected to a voltage reference. The controllable switching element (24) can be in a conducting mode when the snubber capacitor voltage exceeds the reference voltage. In this way, the leakage inductance energy can be transferred to the secondary side instead of being dissipated in a resistor in the snubber circuit. This increases the power efficiency of the converter and reduces electromagnetic interference. At the same time, the solution is very simple and can thus be implemented at a low cost.

10 Claims, 10 Drawing Sheets

(51) Int. Cl.
H02M 7/162 (2006.01)
H02M 7/217 (2006.01)
(52) U.S. Cl.
CPC .... *H02M 7/2176* (2013.01); *H02M 2001/342* (2013.01); *Y02B 70/1491* (2013.01)

(56) References Cited

U.S. PATENT DOCUMENTS

| | | | |
|---|---|---|---|
| 2009/0268489 A1 | 10/2009 | Lin et al. | |
| 2013/0272037 A1* | 10/2013 | Aiello | H02M 3/33507 363/21.17 |
| 2014/0029313 A1 | 1/2014 | Telefus | |
| 2015/0381031 A1* | 12/2015 | Ghosh | H02M 1/34 363/21.12 |

OTHER PUBLICATIONS

International Search Report (PCT/DK2016/000011) (dated Jun. 29, 2016, 2 pgs.).
Written Opinion of the International Searching Authority (PCT/DK2016/000011) (dated Jun. 29, 2016, 3 pgs.).

* cited by examiner

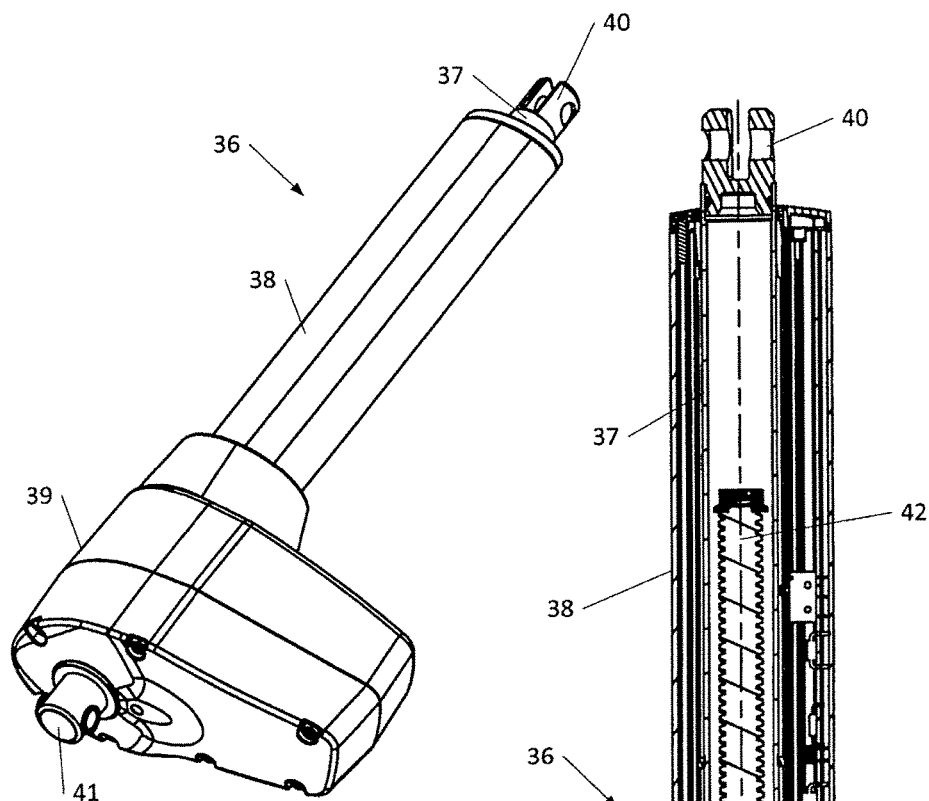
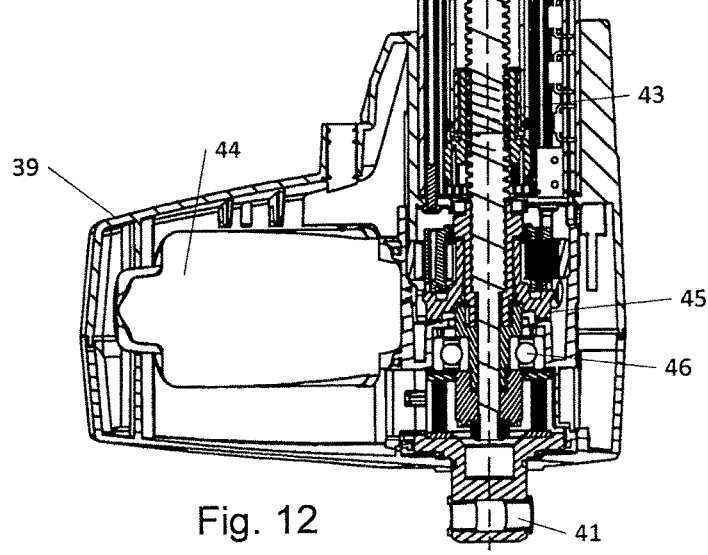
Fig. 11
Fig. 12

ural products, where they can be integrated into a mechanical structure for adjustment of a mechanical movable component. In these applications, switch-mode power supplies have advantages regarding low losses and compact structure.

FLYBACK CONVERTER WITH A SNUBBER CIRCUIT

CROSS-REFERENCE TO RELATED APPLICATIONS

This application is a national stage filing based upon international application no. PCT/DK2016/000011, filed 30 Mar. 2016 (the '011 application), and published in English on 6 Oct. 2016 under international publication no. WO 2016/155737 A1, which claims priority to Denmark (DK) patent application no. PA 2015 00206, filed 31 Mar. 2015 (the '206 application). The '011 application and the '206 application are both hereby incorporated by reference as though fully set forth herein.

TECHNICAL FIELD

The invention relates to a flyback converter comprising a snubber circuit for use in a power supply for an electric actuator system; a power supply comprising a rectifier bridge, a buffer capacitor and at least one such flyback converter; and an actuator system comprising at least one electric actuator and at least one such power supply.

BACKGROUND

Switch-mode power supplies are used in many applications for supplying power from e.g. an AC mains net or a DC voltage source to electric or electronic devices that typically need a regulated voltage supply. An example of such a device is an actuator system with a number of linear electric actuators. Such actuator systems are typically used in adjustable furniture, such as adjustable tables, beds and chairs, but linear electric actuators are also used in several other industrial products, where they can be integrated into a mechanical structure for adjustment of a mechanical movable component. In these applications, switch-mode power supplies have advantages regarding low losses and compact structure.

Many switch-mode power supplies used in these applications are based on a flyback converter, which is a converter type with galvanic isolation between input and output that can be used in both AC/DC and DC/DC conversion. If the flyback converter is used in AC/DC conversion, a bridge rectifier and a capacitor are arranged between the AC mains supply and the converter itself. The main component of the flyback converter is a flyback transformer, the primary side of which is connected to a controllable switching element, typically in the form of a MOSFET transistor, arranged to switch the primary current in the transformer on and off. The secondary winding of the transformer is connected through a diode to a capacitor in parallel with the load, i.e. the device powered by the power supply.

When the switching transistor is in its conducting state, the primary side of the transformer is connected to the input voltage so that energy is accumulated in the transformer, while on the secondary side, the diode is reverse biased, thus preventing a secondary current from flowing. When the switching transistor is in its non-conducting state, no primary current can flow, while on the secondary side, the diode is forward biased, thus allowing a secondary current to flow. In this stage, energy accumulated in the transformer during the previous stage is now transferred from the transformer to the secondary side.

The output voltage is usually controlled by a pulse width modulation control circuit in dependence of the power consumed by the powered device by turning the switching transistor on and off at a certain rate and a certain duty cycle based on a galvanic isolated feedback signal related to the output voltage.

Since the flyback transformer is not ideal, it will have a certain stray inductance or leakage inductance that can be considered as a small inductor in series with the primary winding. Although the energy accumulated in the transformer when the switching transistor is conducting, is transferred from the primary side to the secondary side when the switching transistor is turned off, a small amount of energy accumulated in the leakage inductance will not be transferred. The opening of the switching transistor will therefore cause a high and sharp voltage peak over the transistor, as it will always be the case when an inductor is suddenly disconnected from a DC current. Actually, the leakage inductance will form a series resonant circuit with the parasitic source-drain capacitance of the switching transistor and cause a damped high frequency oscillation.

This high frequency oscillation can be a source of electromagnetic interference in other circuits, which then need to be protected against such interference. Further, the voltage over the switching transistor can reach a level so high that the switching transistor may be damaged or destroyed, or a more expensive transistor type having a voltage rating that exceeds this higher voltage level must be used.

These problems may be counteracted by a so-called snubber circuit, which provides a short-term alternative current path around the switching transistor so that the leakage inductance can be discharged more safely by removing the amount of energy accumulated in the leakage inductance.

A known example of such a snubber circuit consists of a snubber diode in series with a parallel combination of a snubber capacitor and a resistor. The leakage inductance current can now find a low impedance path through the snubber diode and the snubber capacitor so that leakage inductance energy is transferred to the snubber capacitor and then dissipated in the resistor.

Although such snubber circuits do prevent the high voltage spike over the switching transistor from occurring, the power lost in the circuits due to the energy dissipated in the resistor reduces the overall efficiency of the flyback converter.

Lossless snubber circuits capable of recycling the energy stored in the snubber capacitor to the primary winding of the transformer are also known. One example is disclosed in US2009268489 A1 to FSP Technology Inc. Typically, the known lossless snubber circuits need to be able to adapt to a varying load situation, which is achieved by using a timer circuit synchronized to the frequency and duty cycle of the pulse width modulation control circuit. However, the implementation of such circuits is quite complex because of a high component count, and consequently also a high cost.

SUMMARY

Therefore, it is an object of embodiments of the invention to provide a flyback converter with a snubber circuit that can accumulate the leakage inductance energy and return it to the transformer in a lossless way, thus increasing the power efficiency, and which can be implemented with a low number of components and at a low cost.

According to embodiments of the invention the object is achieved in a flyback converter for use in a power supply for an electric actuator system, the flyback converter comprising a flyback transformer having a primary winding and a secondary winding; a diode and a buffer capacitor connected in series with said secondary winding to provide an output voltage over said buffer capacitor; a switching transistor arranged to switch a primary current through said primary winding on and off at a rate and duty cycle determined by a control circuit in dependence of a feedback signal indicative of said output voltage; and a snubber circuit arranged in parallel to said primary winding and comprising a snubber capacitor for accumulating energy stored in a leakage inductance of said flyback transformer when said primary current is switched off. The object is achieved when the snubber circuit further comprises a voltage reference configured to provide a reference voltage indicative of a voltage level reflected from the secondary winding to the primary winding of said flyback transformer when said primary current is switched off; and a controllable switching element arranged in series with said snubber capacitor and having a control terminal connected to said voltage reference so that the controllable switching element is arranged to be in a conducting mode when the voltage over said snubber capacitor exceeds said reference voltage.

By having a controllable switching element in series with the snubber capacitor and controlling it to be switched on as long as the snubber capacitor voltage exceeds a reference voltage corresponding to the reflected voltage, it is ensured that the amount of energy accumulated in the leakage inductance is first accumulated in the snubber capacitor so that the high voltage peak is avoided and then allowed to swing back into the transformer. In this way, the leakage inductance energy can be transferred to the secondary side instead of being dissipated in a resistor in the snubber circuit. This increases the power efficiency of the converter. At the same time, the solution is very simple and can thus be implemented at a low cost, because no synchronization to the frequency and duty cycle of the pulse width modulation control circuit is needed.

In some embodiments, the reference voltage is substantially equal to the voltage level reflected from the secondary winding to the primary winding of said flyback transformer when said primary current is switched off. In that case, the voltage reference may comprise a capacitor connected across the primary winding of said flyback transformer via a series resistor. This is a very simple way of implementing the voltage reference so that it can be used directly for controlling the controllable switching element to be switched on when the snubber capacitor voltage exceeds the reflected voltage from the secondary winding.

In some embodiments, the controllable switching element comprises a field effect transistor. Further, the controllable switching element may comprise a diode connected between a drain terminal and a source terminal of said field effect transistor. A field effect transistor is a commercially available low cost component, and when it comprises an integrated diode, the use of a separate snubber diode can be avoided.

In an embodiment of the flyback converter, the snubber capacitor is connected between the source terminal of said field effect transistor and a node connecting one end of the primary winding of said flyback transformer and said switching transistor; the drain terminal of said field effect transistor is connected to another end of the primary winding of said flyback transformer; and the voltage reference comprises a capacitor connected between a gate terminal of said field effect transistor and the node connecting the primary winding of said flyback transformer and said switching transistor, and a series resistor connected between said gate terminal and said other end of the primary winding of said flyback transformer.

The snubber circuit may further comprise a zener diode connected between the gate terminal and the source terminal of said field effect transistor, said zener diode being arranged for charging the voltage reference capacitor at initial start-up of the flyback converter. This ensures that the voltage reference very fast assumes its intended value when the circuit is switched on.

A power supply may comprise a rectifier bridge, a buffer capacitor and at least one flyback converter as described above. In this way, the power supply can be supplied from an AC mains net, and it benefits from the described advantages of the flyback converter.

An actuator system may comprise at least one electric actuator and at least one power supply as described above. This allows a compact and power efficient actuator system to be designed.

BRIEF DESCRIPTION OF THE DRAWINGS

Embodiments of the invention will now be described more fully below with reference to the drawings, in which
FIG. 11 shows an electrically driven linear actuator;
FIG. 12 shows a longitudinal section through the electrically driven linear actuator of FIG. 11.

DETAILED DESCRIPTION

Figure 1:
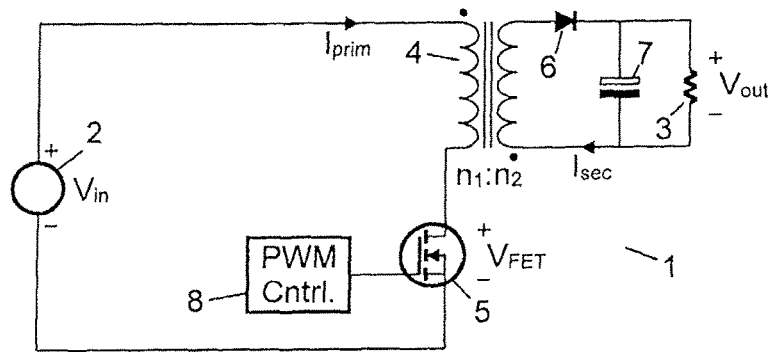
FIG. 1 shows a diagram of a well-known flyback converter.

FIG. 1 shows a diagram of a well-known flyback converter 1 in which the invention can be used. First, the basic structure and function of the flyback converter will be described.

The flyback converter 1 is a switched-mode power supply with galvanic isolation between input and output and configured to convert an input voltage $V_{in}$ of a voltage source 2 to an output voltage $V_{out}$ supplied to a load 3. In FIG. 1, the voltage source 2 is shown as a DC voltage. If the converter is to be used in AC/DC conversion, the input voltage may be provided from e.g. an AC mains supply by means of a bridge rectifier and a capacitor.

The main component of the flyback converter 1 is a flyback transformer 4, the primary side of which is connected to a controllable switching element, typically in the form of a MOSFET transistor 5, arranged to switch the primary current in the transformer 4 on and off. The secondary winding of the transformer 4 is connected through a diode 6 to a capacitor 7 in parallel with the load 3.

When the switching transistor 5 is in its closed (i.e. conducting) state, the primary side of the transformer 4 is directly connected to the input voltage source 2 so that energy is accumulated in the transformer 4. On the secondary side, the diode 6 is reverse biased due to the transformer polarity, thus preventing a secondary current from flowing. In this stage, the capacitor 7 supplies energy to the load 3. When the switching transistor 5 is in its open (i.e. non conducting) state, no primary current can flow in the transformer 4. On the secondary side, the diode 6 is forward biased, thus allowing a secondary current to flow from the transformer. In this stage, energy accumulated in the transformer 4 during the previous stage is now transferred from the transformer 4 to the capacitor 7 and the load 3. Thus the flyback transformer 4 could also be considered as a two-winding inductor, since in contrast to a normal transformer, current does not flow simultaneously in both windings of the transformer. The transformer 4 has a turns ratio $n_1:n_2$, which can be selected to allow a wide range of output voltages in dependence of the use of the flyback converter.

The average value of the output voltage is controlled by a pulse width modulation control circuit 8 in dependence of the power consumed by the load 3. This is done by turning the switching transistor 5 on and off at a certain rate and with a certain duty cycle. The duty cycle is the fraction of the total period (i.e. the period of the periodic function defined by the pulse width modulation control circuit) where the switching transistor 5 is on, and a higher duty cycle results in a higher total power being supplied to the load 3. To perform this regulation, the pulse width modulation control circuit 8 requires a feedback signal related to the output voltage. This feedback signal can be generated in different ways that maintain the isolation between the primary side and the secondary side. One is to use an optocoupler on the secondary side to send the signal to the control circuit 8. Another is to use a separate winding on the flyback transformer 4, and a third one is to sample the voltage amplitude that is reflected to the primary side during the time periods where the switching transistor 5 is off. The generation of the feedback signal is not shown in FIG. 1, because the invention is not related to this signal.

Figure 2:
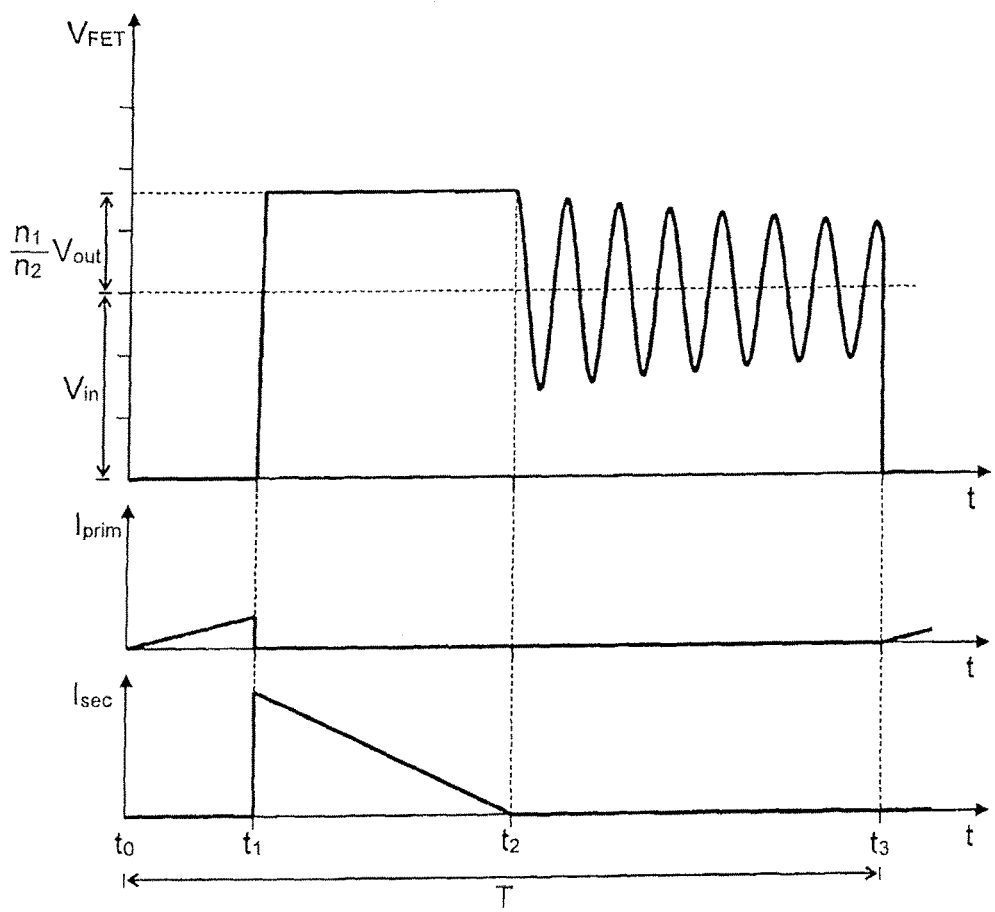
FIG. 2 shows examples of voltage and current waveforms for the flyback converter of FIG. 1.

FIG. 2 illustrates the function of the flyback converter 1 by showing examples of voltage and current waveforms during the on and off states of the switching transistor 5. In the illustrated example, the input voltage $V_{in}$ could be 300 V, the output voltage $V_{out}$ could be 40 V, and the turns ratio $n_1:n_2$ could be 4. It is here noted that since the flyback transformer does not work as a normal transformer, the relation between the input voltage $V_{in}$ and the output voltage $V_{out}$ is not necessarily equal to the turns ratio $n_1:n_2$.

At time $t_0$ the switching transistor 5 is switched on. It is assumed that the converter is already running so that the capacitor 7 is charged to the nominal output voltage $V_{out}$. A current $I_{prim}$ will start to flow through the primary winding, which will induce a voltage over the secondary winding. However, due to the polarity of the secondary winding the diode 6 will be reverse biased and no secondary current $I_{sec}$ will flow. Since the secondary winding can thus be considered as disconnected, the load current is supplied from the capacitor 7, and the primary side of the transformer 4 can be considered as just an inductor. The current in an inductor cannot change rapidly, and the primary current $I_{prim}$ will thus start to increase linearly as illustrated in FIG. 2 with the result that energy is accumulated in the transformer 4. In this phase, the voltage $V_{FET}$ over the switching transistor 5 will, except for a small voltage drop over its on-resistance caused by the increasing primary current, be maintained at zero. The voltage induced over the secondary winding during this phase will be the input voltage $V_{in}$ divided by the turns ratio $n_1:n_2$.

At time $t_1$ the switching transistor 5 is turned off and the primary current $I_{prim}$ is interrupted. The time $(t_1-t_0)$ divided by the period T corresponds to the duty cycle determined by the pulse width modulation control circuit 8. The transformer 4 will try to maintain the magnetic flux, and because the primary current $I_{prim}$ is interrupted, this can only be done by inducing a voltage over the secondary winding high enough to forward bias the diode 6, so that a secondary current $I_{sec}$ will start to flow. The energy that was accumulated in the transformer 4 at time $t_1$ is now transferred to the secondary side of the circuit. The start value of the secondary current $I_{sec}$ will be the primary current $I_{prim}$ just before the time $t_1$ multiplied by the turns ratio $n_1:n_2$. The voltage induced over the secondary winding will, if the voltage drop over the diode 6 is left out, equal $V_{out}$, and this voltage will be reflected to the primary side so that a voltage $V_{out}$ multiplied by the turns ratio $n_1:n_2$ will now occur over the primary winding. Due to the polarity of the transformer, this means that the total voltage $V_{FET}$ over the switching transistor 5 will rapidly increase to this voltage plus the input voltage $V_{in}$, as it is illustrated in FIG. 2. Thus, the voltage rating of the switching transistor 5 must exceed this voltage level.

Unless the switching transistor 5 is switched on again in the meantime, this situation will continue until all the energy accumulated in the transformer 4 has been transferred to the capacitor 7 and the load 3. At that time $t_2$, the secondary current $I_{sec}$ will be zero, and the voltage over the primary winding that was reflected from the secondary side will vanish. However, the voltage $V_{FET}$ over the switching transistor 5 will not, as it could be expected, directly drop to the level of the input voltage $V_{in}$. The switching transistor 5 will have a parasitic source-drain capacitance, which at the time $t_2$ will be charged to the voltage $V_{FET}$ over the switching transistor 5, i.e. the input voltage $V_{in}$, plus the reflected voltage. Also the transformer itself may have a small parasitic capacitance. Thus, the inductance of the primary winding will now form a series resonant circuit with this charged capacitor, and the result is a damped oscillation, as it is shown in FIG. 2. The damping is caused by a small unavoidable resistance in the primary winding.

At time $t_3$ the switching transistor 5 is turned on again, and any remaining energy in the series resonant circuit will be dissipated in the switching transistor so that the damped oscillation will stop. A current $I_{prim}$ will again start to flow through the primary winding as it was described above and the waveforms will be repeated.

It is noted that the duration of the damped oscillation from $t_2$ to $t_3$ will vary in dependence of the duty cycle of the pulse width modulation control circuit 8. With a higher duty cycle, the time from $t_0$ to $t_1$ will be longer so that more energy is accumulated in the transformer 4. Consequently, also the time from $t_1$ to $t_2$, where the energy is transferred to the secondary side, will be longer so that, compared to FIG. 2, $t_2$ will move closer to $t_3$, which is defined by the period T. If $t_2$ becomes equal to $t_3$, the damped oscillation will not occur, and if the duty cycle is increased even further, there will still be a secondary current running when the switching transistor 5 is turned on again, so that the primary current will not start from zero as in FIG. 2. The flyback converter will thus be running in a continuous mode.

However, the waveform for the voltage $V_{FET}$ over the switching transistor 5 shown in FIG. 2 is not fully correct. The transformer 4 is not ideal. It will have a certain stray inductance or leakage inductance that can be considered as a small inductor in series with the primary winding of the transformer 4. Although the energy accumulated in the transformer, as it has been described above, is transferred from the primary side to the secondary side when the switching transistor 5 is turned off, this is not so for the small amount of energy accumulated in the leakage inductance. The opening of the switching transistor 5 will therefore cause a high and sharp voltage peak, as it will always be the case when an inductor is suddenly disconnected from a DC current. Actually, the leakage inductance will form a series resonant circuit with the parasitic source-drain capacitance of the switching transistor 5 described above and thus cause a damped high frequency oscillation, as it shown in FIG. 3. Due to the small size of the leakage inductance, this oscillation will have a much higher frequency and be more damped than the oscillation occurring at time $t_2$ when all accumulated energy has been transferred to the secondary side. This high frequency oscillation causes at least two problems. One is that it is a source of electromagnetic interference in other circuits, which then need to be protected against such interference. Another is that the voltage $V_{FET}$ over the switching transistor 5 will reach a much higher voltage level than in FIG. 2. Thus, the switching transistor 5 may be damaged or destroyed, unless its voltage rating exceeds this higher voltage level.

These problems may be counteracted by a so-called snubber circuit, which provides a short-term alternative current path around the switching transistor 5 so that the leakage inductance can be discharged more safely. A known example of such a snubber circuit is shown in the flyback converter 11 of FIG. 4.

Figure 4:
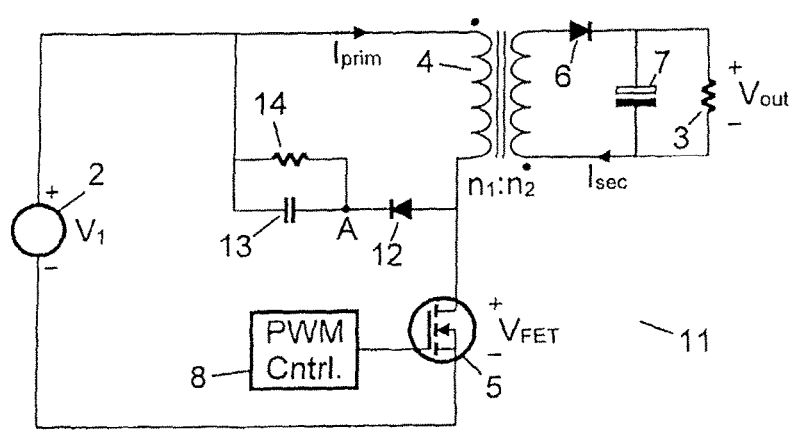
FIG. 4 shows a diagram of a flyback converter with a first example of a known snubber circuit.

In FIG. 4, the snubber circuit consists of a snubber diode 12 in series with a parallel combination of a snubber capacitor 13 and a resistor 14. The leakage inductance current can now find a low impedance path through the snubber diode 12 and the snubber capacitor 13. During the time interval from $t_1$ to $t_2$, i.e. when energy is being transferred from the primary side to the secondary side, the snubber diode 12 will ensure that the snubber capacitor 13 is charged to a voltage around the reflected secondary voltage, i.e. the output voltage $V_{out}$ multiplied by the turns ratio $n_1:n_2$, except for the voltage drop over the snubber diode 12. It is noted that it is the diode end of the snubber capacitor 13 that has the higher potential so that the voltage at this node, i.e. node A in FIG. 4, will equal (again except for the diode voltage drop) the voltage $V_{FET}$ over the switching transistor 5, i.e. the input voltage $V_{in}$ plus the snubber capacitor voltage.

During the two other time intervals, i.e. from $t_0$ to $t_1$ and from $t_2$ to $t_3$, the snubber diode 12 is reverse biased so that the snubber capacitor 13 maintains its charge during these time intervals.

Figure 3:
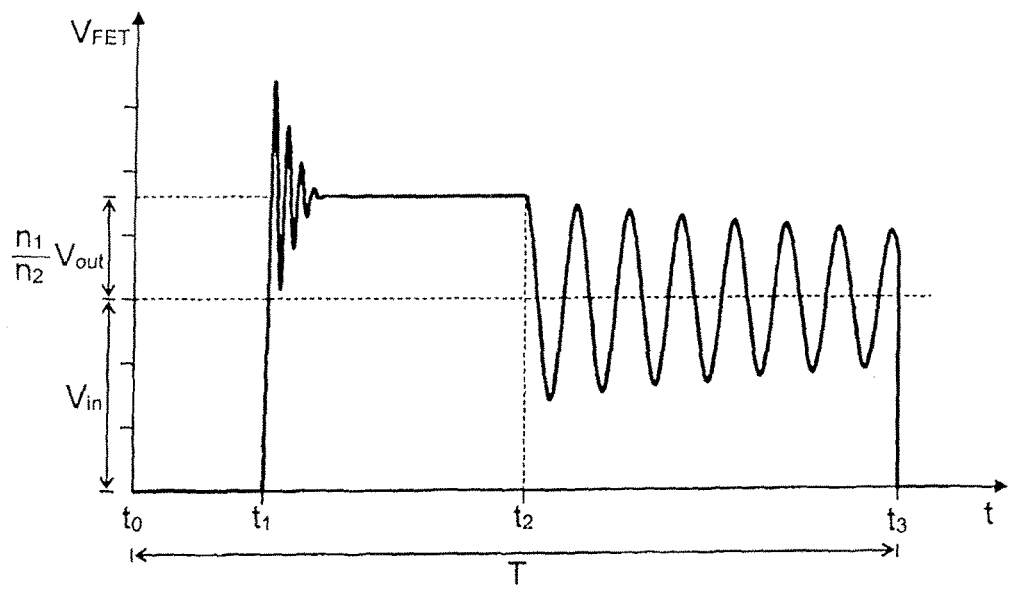
FIG. 3 shows examples of voltage waveforms for the flyback converter of FIG. 1 including a high frequency oscillation due to leakage inductance.

At time $t_1$ when the switching transistor 5 is turned off, the voltage $V_{FET}$ over the switching transistor 5 will, as in FIG. 3, increase rapidly. However, as soon as the voltage exceeds the input voltage $V_{in}$ plus the snubber capacitor voltage, i.e. approximately the output voltage $V_{out}$ multiplied by the turns ratio $n_1:n_2$, the snubber diode 12 will be forward biased and start charging the snubber capacitor 13. This means that the snubber capacitor 13 can now be considered as being coupled in parallel with the parasitic source-drain capacitance of the switching transistor 5 in the series resonant circuit formed by this capacitance and the leakage inductance. If the snubber capacitor 13 is chosen to have a considerably higher capacitance than the parasitic source-drain capacitance, an oscillation like the high frequency oscillation shown in FIG. 3 will still occur, but it will now have a much lower frequency and a much lower amplitude. This is illustrated in FIG. 5.

Figure 5:
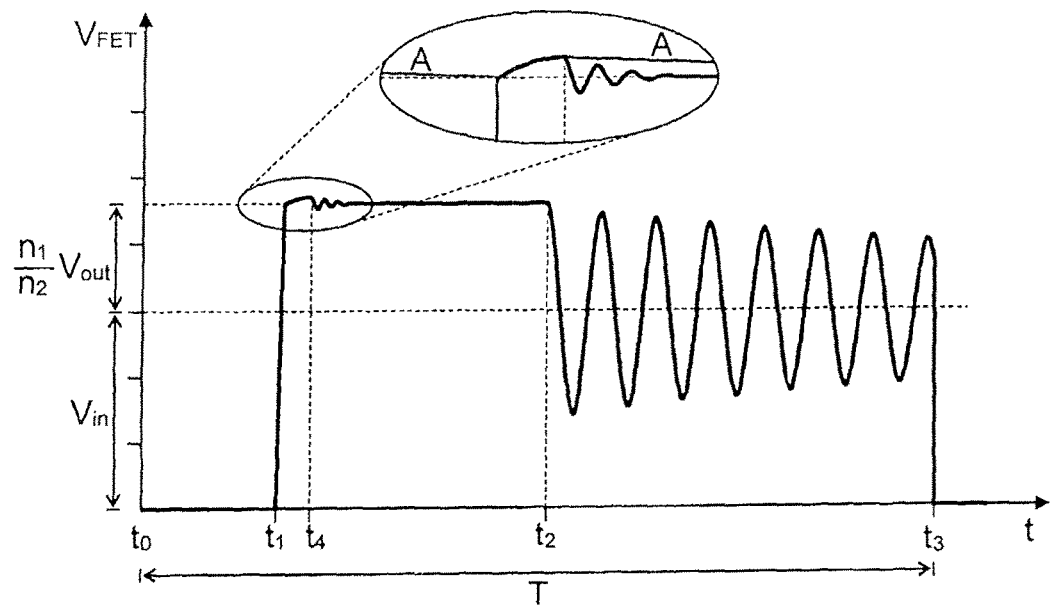
FIG. 5 shows examples of voltage waveforms for the flyback converter of FIG. 4.

Thus, the voltage $V_{FET}$ will increase according to this oscillation, as it is shown is FIG. 5. If it is still supposed that the voltage levels are sufficiently high to disregard the voltage drop over the snubber diode 12, the voltage in node A will follow this voltage as the snubber capacitor 13 is charged by the energy from the leakage inductance. When the first top of the oscillation is reached at time $t_4$, the series resonant current will change direction, and the snubber diode 12 will again be reverse biased. Thus, the snubber capacitor 13 is again disconnected from the series resonant circuit formed by the parasitic source-drain capacitance and the leakage inductance, and the series resonant circuit will continue to oscillate with the previous high frequency. However, since most of the energy has now been dumped into the snubber capacitor 13 the amplitude will be much lower than before, which can also be seen in FIG. 5.

Since the snubber diode 12 is now reverse biased, the snubber capacitor voltage will no longer follow the oscillation, but will remain at the voltage to which it was charged. To prevent that an excessive voltage builds up over the snubber capacitor 13, the resistor 14 is provided across it. The purpose of this resistor is to dissipate the energy dumped into the snubber capacitor 13 from the leakage inductance, and thus it should be selected small (i.e. with a low resistance value) enough to ensure that the amount of energy dumped from the leakage inductance in one period T can be dissipated before a new amount of energy is dumped in the next period T. On the other hand, if more energy is dissipated, the snubber capacitor voltage will drop below the voltage reflected from the secondary side, and the snubber diode 12 will then be forward biased too early so that also a portion of the energy that should have been transferred to the secondary side will disappear in the snubber capacitor 13. In the example shown in FIG. 5 it is illustrated that from time $t_4$ the voltage in node A decreases slowly because energy is dissipated in the resistor 14 so that it has reached the input voltage $V_{in}$ plus the reflected voltage at time $t_1$ in the next period.

Figure 6:
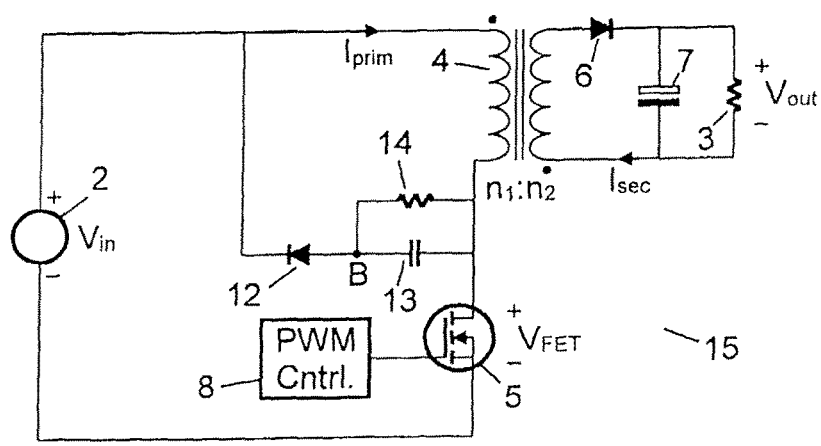
FIG. 6 shows a diagram of a flyback converter with a second example of a known snubber circuit.

FIG. 6 shows a flyback converter 15 with a snubber circuit that is very similar to the one of FIG. 4. The only difference is that the snubber diode 12 and the parallel combination of the snubber capacitor 13 and the resistor 14 have switched position in the series connection so that the snubber diode 12 is connected to the input voltage $V_{in}$ and the snubber capacitor 13 to the drain terminal of the switching transistor 5. The function of this circuit is the same as described above, and the snubber capacitor voltage will also be the same as above. However, the voltage in node B in FIG. 6 will differ from that of node A in FIG. 4, because the other end of the snubber capacitor 13 is now connected to the drain terminal of the switching transistor 5 instead of the input voltage $V_{in}$.

Although the snubber circuits shown in FIGS. 4 and 6 do prevent the high voltage peak shown in FIG. 3 from occurring, as it has been described above, the power lost in the circuits due to the energy dissipated in the resistor 14 reduces the overall efficiency of the flyback converter.

An embodiment of an improved snubber circuit not suffering from this drawback is described below and illustrated in FIG. 7. Similar to the flyback converter 15 of FIG. 6, the snubber circuit of the flyback converter 21 of FIG. 7 has a snubber diode 22 and a snubber capacitor 23 coupled in series over the primary winding of transformer 4. A controllable switching element in the form of an n-channel MOSFET transistor 24 is coupled in parallel to the snubber diode 22 with its source terminal connected to node D between the snubber diode 22 and the snubber capacitor 23 and its drain terminal connected to the input voltage $V_{in}$. It is noted that a MOSFET transistor has an integrated so-called body diode that can replace the snubber diode 22. However, in the following the snubber diode 22 and the MOSFET transistor 24 are shown as separate components for easier explanation of the function, although in practice the diode is not needed as a separate component. The gate terminal of the MOSFET transistor 24 is connected to a capacitor 25 arranged to work as a reference voltage, as it will be described below. Further, a resistor 26 is connected between the capacitor 25 and the input voltage $V_{in}$, and a zener diode 27 is connected between the gate and source terminals of MOSFET transistor 24.

The function of the snubber diode 22 and the snubber capacitor 23 is in principle the same as described above in relation to FIGS. 4 and 6, and thus most of the time the voltage $V_C$ over the snubber capacitor 23 will be around the voltage reflected to the primary winding of the transformer 4, i.e. the output voltage $V_{out}$ multiplied by the turns ratio $n_1:n_2$. Initially, when the converter is switched on, the capacitor 25 acting as a voltage reference is supplied with energy from the snubber capacitor 23 via the zener diode 27 and is then stabilized to a voltage level corresponding to the reflected voltage, i.e. the output voltage $V_{out}$ multiplied by the turns ratio $n_1:n_2$, by the high-ohmic resistor 26 connected to the input voltage $V_{in}$. This reference voltage ensures that the MOSFET transistor 24 is switched on when the voltage on the snubber capacitor 23 exceeds the reference voltage, as it will be described below.

Figure 8:
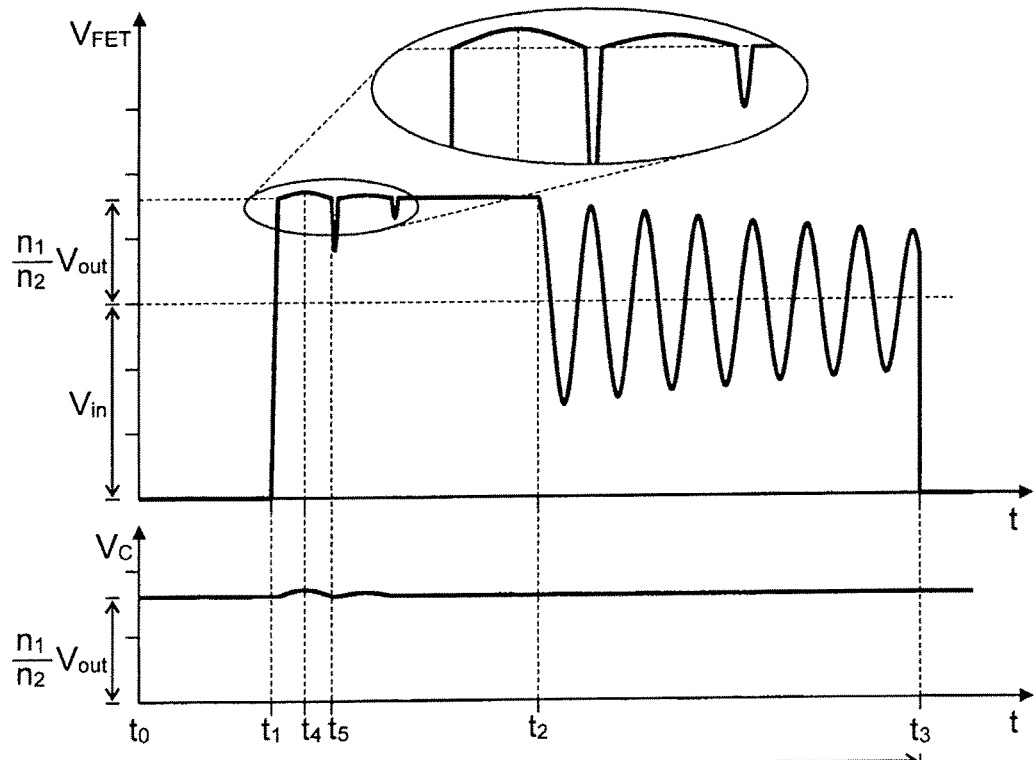
FIG. 8 shows examples of voltage waveforms for the flyback converter of FIG. 7.

Around time $t_1$, where the switching transistor 5 is switched off, this snubber circuit functions similar to the circuits of FIGS. 4 and 6. This means that at time $t_1$ the voltage $V_{FET}$ over the switching transistor 5 will, as in FIG. 5, increase rapidly. Waveforms for this snubber circuit are shown in FIG. 8. When the voltage $V_{FET}$ exceeds the input voltage $V_{in}$ plus the snubber capacitor voltage, i.e. the output voltage $V_{out}$ multiplied by the turns ratio $n_1:n_2$, the snubber diode 22 will be forward biased and start charging the snubber capacitor 23. Thus also here, the snubber capacitor 23 can now be considered as being coupled in parallel with the parasitic source-drain capacitance of the switching transistor 5 in the series resonant circuit formed by this capacitance and the leakage inductance. Again an oscillation with a lower frequency and a lower amplitude will occur, as it was the case in FIG. 5.

Thus, the voltage $V_{FET}$ will increase according to this oscillation, as it is shown in FIG. 8. The voltage $V_C$ on the snubber capacitor 23 will increase accordingly. As soon as this voltage exceeds the reference voltage on capacitor 25, the MOSFET transistor 24 will be switched on to conduct in parallel to the snubber diode 22, because the voltage on its gate terminal will be higher than the voltage on its source terminal. However, at this time the conducting MOSFET transistor 24 will not make any difference because the snubber diode 22 is still conducting in parallel with the transistor.

When the first top of the oscillation is reached at time $t_4$, the series resonant current will change direction, and the snubber diode 22 will again be reverse biased. However, the MOSFET transistor 24 will continue to be conducting, and thus, the snubber capacitor 23 will remain connected to the series resonant circuit formed by the parasitic source-drain capacitance and the leakage inductance, and the series resonant circuit will continue to oscillate with the lower frequency. This means that the energy from the leakage inductance that was dumped into the snubber capacitor 23 from $t_1$ to $t_4$ will now be allowed to swing back into the primary winding of the transformer 4. The transformer will now act as a normal transformer with current flowing simultaneously in both windings, and thus the energy will be transferred to the secondary side instead of being lost in the snubber circuit.

At time $t_5$, the voltage of the snubber capacitor 23 will again have reached the reference voltage on the capacitor 25 with the result that the MOSFET transistor 24 is switched off, so that the snubber capacitor 23 is again disconnected from the series resonant circuit formed by the parasitic source-drain capacitance and the leakage inductance. The series resonant circuit will therefore now continue to oscillate with the previous high frequency, and a negative half cycle of this frequency will occur in the voltage $V_{FET}$ over the switching transistor 5. However, since a considerable part of the energy has now been transferred to the secondary side of the transformer, the amplitude will be lower than the original oscillation shown in FIG. 3, as it can also be seen in FIG. 8. Since neither the snubber diode 22, nor the MOSFET transistor 24 is conducting, this negative spike will not occur in the voltage of the snubber capacitor 23. When the voltage $V_{FET}$ at the end of the negative spike again reaches the input voltage $V_{in}$ plus the snubber capacitor voltage, i.e. $V_{in}$ plus the output voltage $V_{out}$ multiplied by the turns ratio $n_1:n_2$, the snubber diode 22 will be forward biased, and the situation from time $t_1$ will be repeated. Thus, as shown in FIG. 8, energy from the leakage inductance is again transferred to the snubber capacitor 23, however with a lower amplitude than before, and the MOSFET transistor 24 ensures that the energy can again swing back into the transformer 4. This is repeated with still lower amplitudes until all the energy has been transferred, or until any one of times $t_2$ or $t_3$ occurs, if that should happen first.

Thus, the MOSFET transistor 24 controlled by the voltage difference between the snubber capacitor 23 and the reference voltage capacitor 25 ensures that the amount of energy accumulated in the leakage inductance is now transferred to the secondary side instead of being dissipated in a resistor as it was the case in the snubber circuits shown in FIGS. 4 and 6. At the same time, the solution is very simple and can thus be implemented at a low cost.

Figure 9:
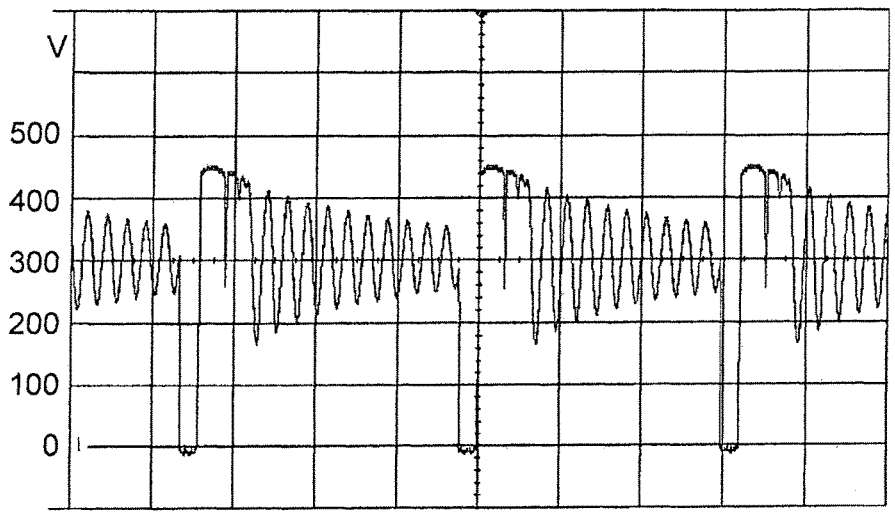
FIG. 9 shows examples of a measured voltage waveform for a flyback converter modified according to FIG. 7.

To show the effect of the snubber circuit suggested above, a standard switch-mode power supply of a type normally used for electric actuators has been modified with the new snubber circuit. The voltage on the drain terminal of the switching transistor was measured. Without the snubber circuit, the measured peak voltage was approximately 700 Volt, which means that in order to avoid damage or destruction of the switching transistor, the transistor needs to be rated to maybe 800 or 900 Volt. Although transistors with such rating are available, the component cost is clearly increased. FIG. 9 shows the measured waveform of the voltage on the drain terminal of the switching transistor with the suggested snubber circuit installed. It can be seen that the maximum voltage when the switching transistor is switched off is reduced to about 450 Volt. The first half period after this moment indicates that the snubber circuit works as intended, i.e. the high voltage peak is avoided by first charging the leakage inductance energy into the snubber capacitor and then returning it without loss into the primary winding where it is transferred to the secondary winding. This can also be seen by comparing with FIG. 8.

Figure 7:
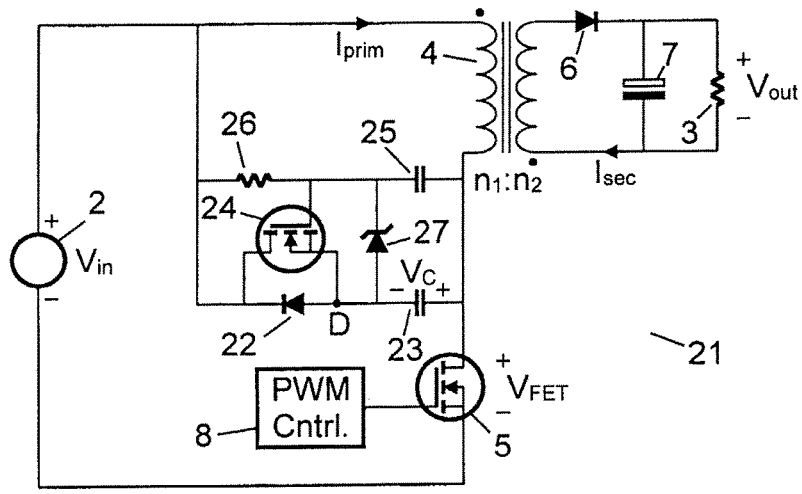
FIG. 7 shows a diagram of a flyback converter with an embodiment of an improved snubber circuit.

It is noted that in FIG. 7, the snubber diode 22 and the MOSFET transistor 24 are shown as separate components for easier explaining the function of the suggested snubber circuit. However, in practice MOSFET transistors include a so-called body diode that can perform the functions of the snubber diode. In other words, only one component is needed because the snubber diode can be considered as integrated in the MOSFET transistor. This is also illustrated with the MOSFET transistor 34 in FIG. 10, which shows a power supply 31 for converting an AC voltage, e.g. a mains supply, to a DC voltage for electric actuators. Thus, in FIG. 10 the load is represented by an electric actuator 33. The AC voltage from the mains supply is rectified in a bridge rectifier 32 and buffered in a capacitor 35, before it is fed to the flyback converter as it was shown in FIG. 7. The output of the flyback converter is then supplied to the electric actuator 33.

Figure 10:
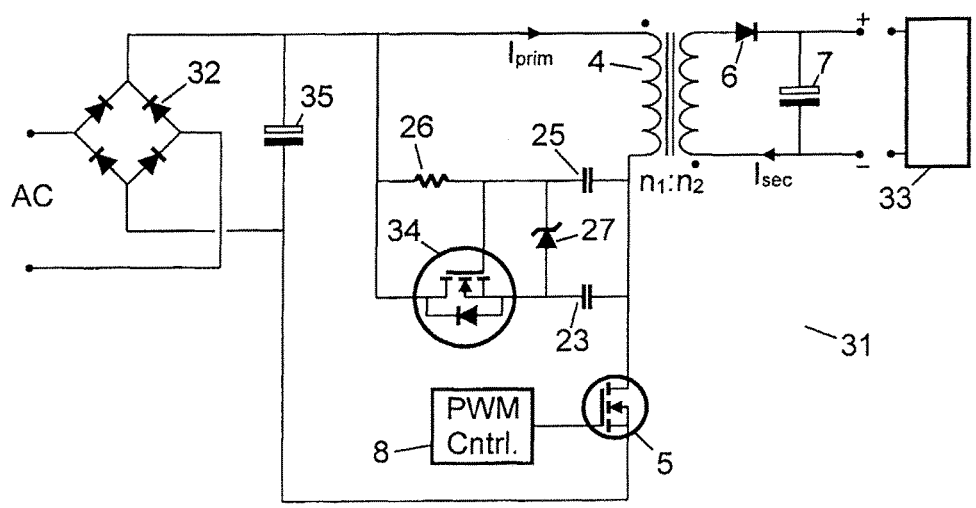
FIG. 10 shows a diagram of a power supply with the flyback converter of FIG. 7.

Just like in FIGS. 4 and 6, where the snubber diode 12 and the parallel combination of the snubber capacitor 13 and the resistor 14 had switched position in the series connection, the suggested snubber circuit of FIGS. 7 and 10 can also be modified by switching positions of the snubber capacitor 23 and the MOSFET transistor 24 or 34 including the snubber diode, so that the MOSFET transistor is connected to the drain terminal of the switching transistor 5 and the snubber capacitor to the input voltage $V_{in}$. In that case, the MOSFET transistor should be a p-channel MOSFET instead of the n-channel MOSFET shown in FIGS. 7 and 10. Otherwise, the function will be the same as described above.

In the embodiments described above, a MOSFET transistor 24 or 34 is used as a controllable switching element to achieve the effect of the improved snubber circuit. However, the controllable switching element can also be implemented with other component types. As one example, an Insulated Gate Bipolar Transistor, IGBT, could be used instead of the MOSFET transistor. However, in that case a separate snubber diode is still needed, because an IGBT does not have an integrated body diode.

The voltage reference may also be implemented in other ways than with the capacitor 25 shown in FIG. 7. The advantage of the capacitor is that it is a very simple implementation, but other electronic circuits capable of providing a reference voltage substantially equal to the voltage reflected from the secondary side to the primary side when the primary current is off can be used as well.

FIG. 11 shows a linear actuator 36 of a type comprising a driving rod. The driving rod is also known as an inner tube 37. The linear actuator 36 comprises an outer tube 38 and a motor housing 39. The linear actuator 36 further comprises a front mounting 40 at the outer end of the inner tube 37 and a rear mounting 41 at the motor housing 39. FIG. 12 shows a sectional view of the linear actuator in FIG. 11. The linear actuator 36 comprises a spindle unit consisting of a spindle 42 on which a spindle nut 43 is arranged. The spindle nut 43 can be secured against rotation. The inner tube 37 is secured to the spindle nut 43 and can thus be moved in and out of the outer tube 38 depending of the direction of rotation of the spindle 42. The spindle 42 is driven by a reversible electric motor 44 via a transmission. Here, the transmission comprises a worm arranged in continuation of the drive shaft of the electric motor 44, as well as a worm wheel 45 secured to the spindle 42. A bearing 46 is further secured to the spindle 42. The bearing 46 can e.g. be a ball bearing or a roller bearing. Only the main components of the linear actuator 36 are described here. However, the linear actuator 36 can also be equipped with e.g. a braking device, additional bearings, quick release mechanism etc.

Figures 13, 14:
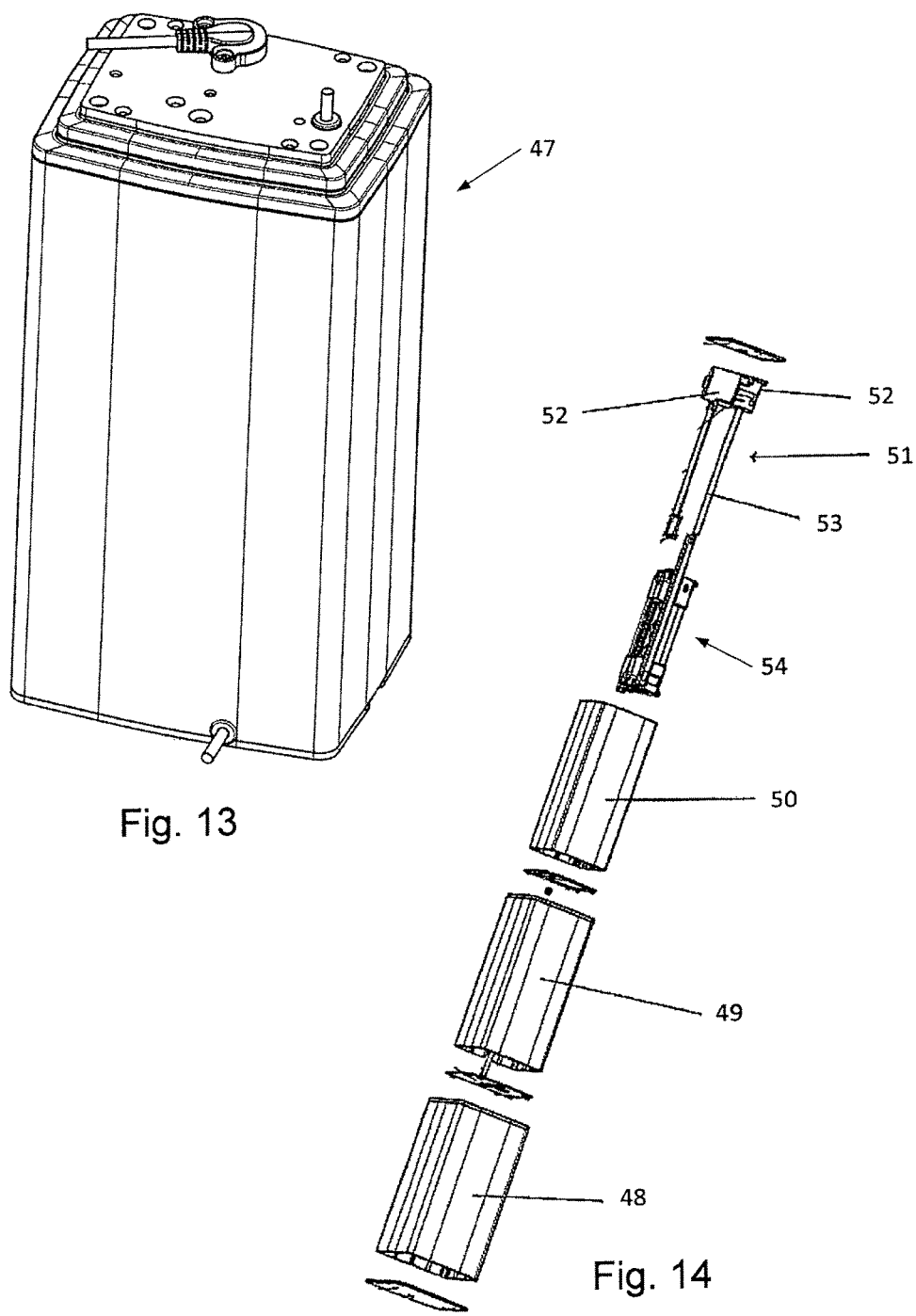
FIG. 13 shows a lifting column in first embodiment comprising an electrically driven linear actuator as a drive unit.
FIG. 14 shows an exploded perspective of the lifting column in FIG. 13.

FIG. 13 shows another linear actuator embodied as a lifting column 47 depicted in its fully retracted position. FIG. 14 shows a downscaled exploded view of the lifting column 47 in FIG. 13. The lifting column 47 comprises a lower member 48, an intermediate member 49, which can extend telescopically out of the lower member 48, and an innermost member 50, which can extend out of the intermediate member 49 synchronous with the extension of this out of the lower member 48. As can be seen from FIG. 14 the lifting column 47 comprises a linear actuator 51 with reversible DC-motor having a gear 52, which drives a spindle 53. The lifting column 47 further comprises a chain unit 54, which via a spindle nut is in driving connection with a spindle 53. Depending of the direction of rotation of the spindle 53, the lifting column can be extended or retracted.

Figure 15:
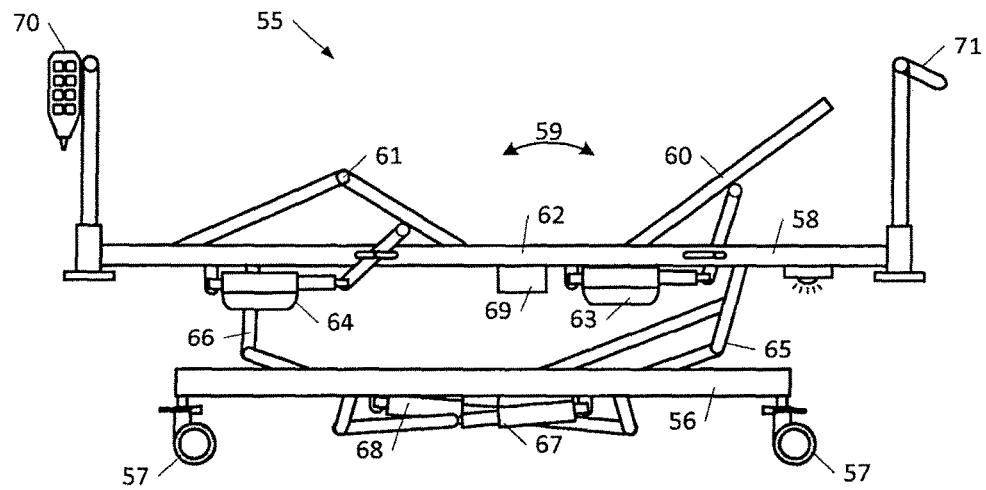
FIG. 15 shows a schematic view of a hospital bed in a first embodiment.

FIG. 15 shows a hospital bed 55 with a lower frame 56 equipped with drive wheels 57 and an upper frame 58. The upper frame 58 is fitted with an adjustable carrying surface 59 for a mattress (not shown). The carrying surface 59 comprises a back rest section 60, an articulated leg rest section 61 and a fixed middle section 62 between these. The back rest and leg rest section 60, 61 can be adjusted by means of a linear actuator 63, 64 each, such that the carrying surface 59 can assume different contours. The upper frame 58 is connected to the lower frame 56 with a link mechanism 65, 66 at each end. The upper frame 58 can be raised and lowered by means of a pair of linear actuators 67, 68 connected to the link mechanisms 65, 66. All the linear actuators 63, 64, 67, 68 are connected to a control box 69 containing a controller. The control box 69 can readily be powered by the power supply 31 described in FIG. 10 by which the power consumption can be reduced. The control box 69 is connected to one or more operating units, such as a hand control 70 and an operating panel 71 integrated into the headboard of the bed 55, as well as possible other peripheral equipment. The actuator system comprising the actuators 63, 64, 67, 68, the control box 69 and operating units 70, 71 is known as a linear actuator system.

Figure 16:
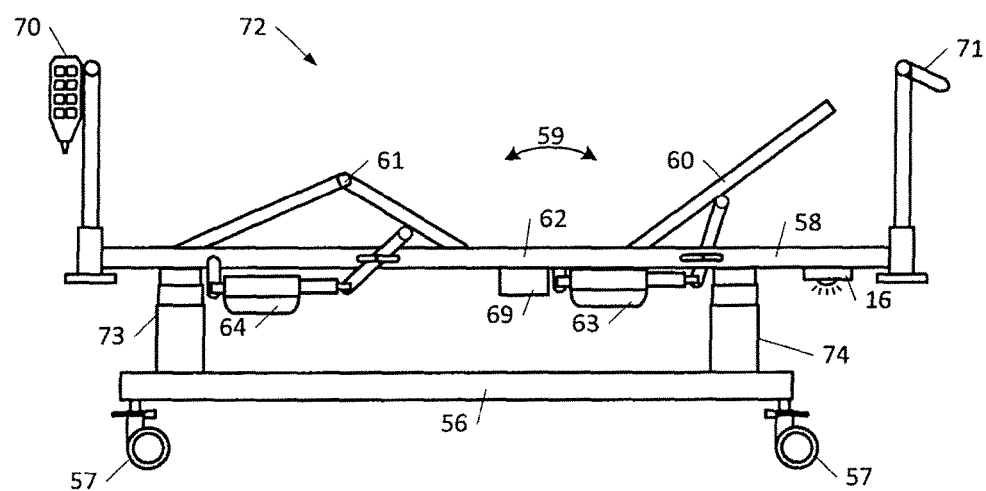
FIG. 16 shows a schematic view of a hospital bed in second embodiment.

FIG. 16 shows a schematic view of a hospital and care bed 72 in a different embodiment than the bed in FIG. 15. Here, the lower frame 56 and the upper frame 58 are not connected by means of link mechanisms, but are instead connected via two linear actuators designed as lifting columns 73, 74 as described in FIGS. 13 and 14.

Figure 17:
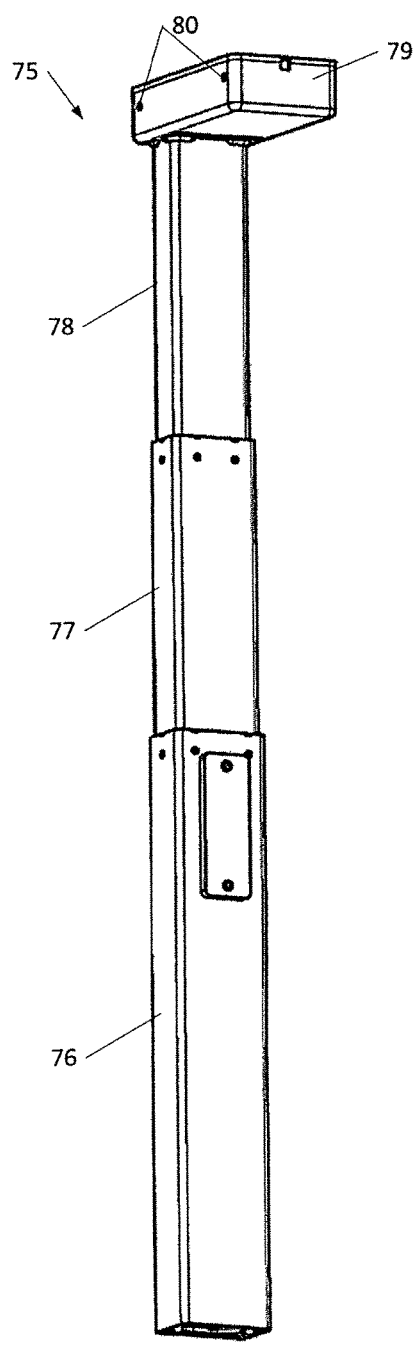
FIG. 17 shows a lifting column in a second embodiment comprising an electrically driven linear actuator as a drive unit.
Figure 18:
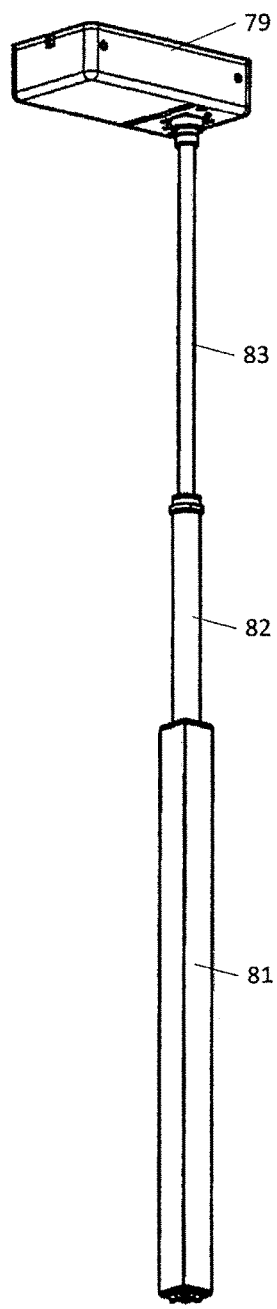
FIG. 18 shows the lifting column of FIG. 17 where the telescopically arranged profiles have been removed.

FIG. 17 shows a linear actuator in the form of a lifting column 75 having three telescopic members 76, 77, 78 arranged inside each other, where the outermost member 76 with its lower end is intended for securing e.g. to a foot. At the upper end of the innermost member 78 there is a housing 79, which is located perpendicular to the broad side of the telescopic members 76, 77, 78 of the lifting column 75. The sides and the end of the housing 79, which are level with the telescopic members 76, 77, 78, are equipped with screw holes 80 e.g. for mounting the lifting column 75 to a table top/frame carrying a table top. FIG. 18 of the drawing shows the spindle unit of the lifting column 75, which comprises an outer tube 81, the lower end of which is retained at the bottom of the outermost member 76. At the top of the tube 81 a coupler with internal threads for a hollow spindle 82 is secured, where the top likewise is equipped with a coupler with internal threads for a solid spindle 83. At the outermost end of the solid spindle 83 is connected to a motor unit in the housing 79.

Figure 19:
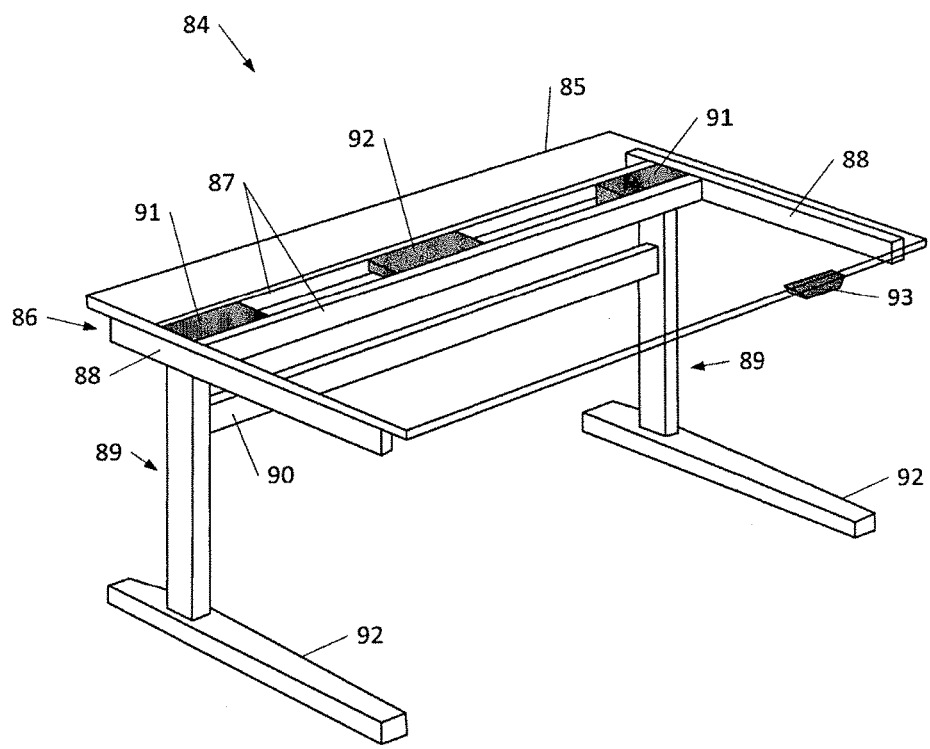
FIG. 19 shows a schematic perspective of a height-adjustable with a lifting column.

FIG. 19 illustrates a height-adjustable table 84 shown in perspective, where the table top 85 is depicted as transparent. The carrying frame 86 on which the table top 85 is mounted comprises two parallel longitudinal members 87 and two parallel cross members 88. The two lifting columns 89 of the type described in FIGS. 17 and 18 are here interconnected by means of an architrave 90 in order to increase the stability of the height-adjustable table 84. It is desired to mount the motor housing 91 of the lifting columns and the control box 92 within the dimensions, i.e. length, width and height, given by these longitudinal members 87 and cross members 88. The lower end of each lifting column 89 comprises a foot 92 on which the height-adjustable table 84 stands. The lifting columns are connected to the control box 92, which again are connected to the operating unit 93. The height-adjustable table 84 is adjusted by operating the operating unit 93. In order to reduce power consumption, the control box 92 can be powered by the power supply 31 described in FIG. 10.

In other words, a flyback converter for use in a power supply for an electric actuator system is disclosed. The flyback converter comprises a flyback transformer having a primary winding and a secondary winding; a diode and a buffer capacitor connected in series with said secondary winding to provide an output voltage over said buffer capacitor; a switching transistor arranged to switch a primary current through said primary winding on and off at a rate and duty cycle determined by a control circuit in dependence of a feedback signal indicative of said output voltage; and a snubber circuit arranged in parallel to said primary winding and comprising a snubber capacitor for accumulating energy stored in a leakage inductance of said flyback transformer when said primary current is switched off. The snubber circuit further comprises a voltage reference configured to provide a reference voltage indicative of a voltage level reflected from the secondary winding to the primary winding of said flyback transformer when said primary current is switched off; and a controllable switching element arranged in series with said snubber capacitor and having a control terminal connected to said voltage reference so that the controllable switching element is arranged to be in a conducting mode when the voltage over said snubber capacitor exceeds said reference voltage.

By having a controllable switching element in series with the snubber capacitor and controlling it to be switched on as long as the snubber capacitor voltage exceeds a reference voltage corresponding to the reflected voltage, it is ensured that the amount of energy accumulated in the leakage inductance is first accumulated in the snubber capacitor so that the high voltage peak is avoided and then allowed to swing back into the transformer. In this way, the leakage inductance energy can be transferred to the secondary side instead of, being dissipated in a resistor in the snubber circuit. This increases the power efficiency of the converter. At the same time, the solution is very simple and can thus be implemented at a low cost, because no synchronization to the frequency and duty cycle of the pulse width modulation control circuit is needed.

In some embodiments, the reference voltage is substantially equal to the voltage level reflected from the secondary winding to the primary winding of said flyback transformer when said primary current is switched off. In that case, the voltage reference may comprise a capacitor connected across the primary winding of said flyback transformer via a series resistor. This is a very simple way of implementing the voltage reference so that it can be used directly for controlling the controllable switching element to be switched on when the snubber capacitor voltage exceeds the reflected voltage from the secondary winding.

In some embodiments, the controllable switching element comprises a field effect transistor. Further, the controllable switching element may comprise a diode connected between a drain terminal and a source terminal of said field effect transistor. A field effect transistor is a commercially available low cost component, and when it comprises an integrated diode, the use of a separate snubber diode can be avoided.

In an embodiment of the flyback converter, the snubber capacitor is connected between the source terminal of said field effect transistor and a node connecting one end of the primary winding of said flyback transformer and said switching transistor; the drain terminal of said field effect transistor is connected to another end of the primary winding of said flyback transformer; and the voltage reference comprises a capacitor connected between a gate terminal of said field effect transistor and the node connecting the primary winding of said flyback transformer and said switching transistor, and a series resistor connected between said gate terminal and said other end of the primary winding of said flyback transformer.

The snubber circuit may further comprise a zener diode connected between the gate terminal and the source terminal of said field effect transistor, said zener diode being arranged for charging the voltage reference capacitor at initial start-up of the flyback converter. This ensures that the voltage reference very fast assumes its intended value when the circuit is switched on.

A power supply may comprise a rectifier bridge, a buffer capacitor and at least one flyback converter as described above. In this way, the power supply can be supplied from an AC mains net, and it benefits from the described advantages of the flyback converter.

An actuator system may comprise at least one electric actuator and at least one power supply as described above. This allows a compact and power efficient actuator system to be designed.

Although various embodiments of the present invention have been described and shown, the invention is not restricted thereto, but may also be embodied in other ways within the scope of the subject-matter defined in the following claims.

The invention claimed is:

1. A flyback converter for use in a power supply for an electric actuator system, the flyback converter comprising:

a flyback transformer having a primary winding and a secondary winding;

a diode and a buffer capacitor connected in a series with said secondary winding to provide an output voltage over said buffer capacitor;

a switching transistor arranged to switch a primary current through said primary winding on and off at a rate and duty cycle determined by a control circuit in dependence of a feedback signal indicative of said output voltage; and a snubber circuit arranged in parallel to said primary winding and comprising a snubber capacitor for accumulating energy stored in a leakage inductance of said flyback transformer when said primary current is switched off, wherein the snubber circuit further comprises a voltage reference configured to provide a reference voltage indicative of a voltage level reflected from the secondary winding to the primary winding of said flyback transformer when said primary current is switched off; and a controllable switching element arranged in series with said snubber capacitor and having a control terminal connected to said voltage reference so that the controllable switching element is arranged to be in a conducting mode when the voltage over said snubber capacitor exceeds said reference voltage.

2. A flyback converter according to claim 1 wherein said reference voltage is substantially equal to the voltage level reflected from the secondary winding to the primary winding of said flyback transformer when said primary current is switched off.

3. A flyback converter according to claim 2 wherein said voltage reference comprises a capacitor connected across the primary winding of said flyback transformer via a series resistor.

4. A flyback converter according to claim 1 wherein said controllable switching element comprises a field effect transistor.

5. A flyback converter according claim 4 wherein said diode is a first diode and said controllable switching element further comprises a second diode connected between a drain terminal and a source terminal of said field effect transistor.

6. A flyback converter according claim 5 wherein said snubber capacitor is connected between the source terminal of said field effect transistor and a node connecting one end of the primary winding of said flyback transformer and said switching transistor;

the drain terminal of said field transistor is connected to another end of the primary winding of said flyback transformer; and said voltage reference comprises a further capacitor connected between a gate terminal of said field effect transistor and the node connecting the primary winding of said flyback transformer and said switching transistor, and a series resistor connected between said gate terminal and said other end of the primary winding of said flyback transformer.

7. A flyback converter according to claim 6 wherein the snubber circuit further comprises a zener diode connected between the gate terminal and the source terminal of said field effect transistor, said zener diode being arranged for charging the voltage reference capacitor at initial start-up of the flyback converter.

8. A power supply comprising a rectifier bridge, a further buffer capacitor and at least one flyback converter according to claim 1.

9. An actuator system comprising at least one electric actuator and at least one power supply according to claim 8.

10. A flyback converter according to claim 1 wherein the voltage level reflected from the secondary winding to the primary winding corresponds to said output voltage multiplied by a turns ratio of the flyback transformer.

* * * * *